United States Patent [19]
Pelletier et al.

[11] Patent Number: 5,907,239
[45] Date of Patent: May 25, 1999

[54] METHODS OF ENHANCING CAPACITY OF TRANSFORMER EQUIPMENT AND OF POWER FLOW CONTROL USING PHASE-SHIFTING TRANSFORMERS AND SERIES IMPEDANCES IN PARALLEL ARRANGEMENTS

[75] Inventors: Pierre Pelletier; Jacques Brochu; François Beauregard, all of Boucherville; Gaston Morin, Carignan, all of Canada

[73] Assignee: Citeq, Varennes, Canada

[21] Appl. No.: 08/809,137

[22] PCT Filed: Nov. 14, 1995

[86] PCT No.: PCT/CA95/00652

§ 371 Date: Mar. 24, 1997

§ 102(e) Date: Mar. 24, 1997

[87] PCT Pub. No.: WO96/15572

PCT Pub. Date: May 23, 1996

[30] Foreign Application Priority Data

Nov. 14, 1994 [GB] United Kingdom ............... 9422902

[51] Int. Cl.⁶ ............... H01F 30/12; G05F 1/70; H02J 1/00
[52] U.S. Cl. ............... 323/361; 323/205; 307/87
[58] Field of Search ............... 323/361, 205, 323/358; 307/19, 20, 18, 83, 87

[56] References Cited

U.S. PATENT DOCUMENTS

| | | | |
|---|---|---|---|
| 4,621,198 | 11/1986 | Roberge et al. | 307/82 |
| 5,343,139 | 8/1994 | Guygyi et al. | 323/207 |
| 5,517,422 | 5/1996 | Ilic et al. | 307/57 |

FOREIGN PATENT DOCUMENTS

| | | |
|---|---|---|
| 43 23 290 | 1/1995 | Germany. |
| 94/17579 | 8/1994 | WIPO. |
| 94/27351 | 11/1994 | WIPO. |

OTHER PUBLICATIONS

Historical Transformer Designs For Phase–Angle Regulating Equipment, by Stan Lindgren, published in FACTS, Apr. 1992, "Current Activity In Flexible AC Transmission Systems," pp. 67–69.

Noroozian et al., "Power Flow Control By Use of Controllable Series Components", *IEEE Transactions on Power Delivery*, vol. 8(3):1420–1429, (1993).

Youssef, "Phase–shifting Transformers in Load Flow And Short–Circuit Analysis: Modelling And Control" *IEE Proceedings13 C*, 140(4):331–336, (1993).

Bladow et al., "Experiences With Parallel EHV Phase Shifting Transformers", *IEEE Transactions on Power Delivery*, vol. 6(3):1096–1090, (1991).

*Primary Examiner*—Peter S. Wong
*Assistant Examiner*—Rajnikant B. Patel
*Attorney, Agent, or Firm*—Foley & Lardner

[57] ABSTRACT

A method and apparatus for enhancing the capacity of a transformer for a polyphase AC network. The method and apparatus having a constant current transformer branch connected in parallel with at least one conventional transformer branches. The constant current transformer branch includes a phase-shifting transformer in series with reactive elements. Further, for power flow control between two synchronous polyphase AC network busses, two parallel branches are used in which one includes a phase-shifting transformer, while the other includes a reactive element. An additional phase-shifting transformer is added in series with the reactive element to enhance the power flow control flexibility.

23 Claims, 10 Drawing Sheets

METHODS OF ENHANCING CAPACITY OF TRANSFORMER EQUIPMENT AND OF POWER FLOW CONTROL USING PHASE-SHIFTING TRANSFORMERS AND SERIES IMPEDANCES IN PARALLEL ARRANGEMENTS

FIELD OF THE INVENTION

The invention relates to a method of enhancing capacity of transformer equipment for a polyphase AC network without augmentation of its short-circuit level, and an apparatus thereof. The invention also relates to a method of power flow control between two synchronous polyphase AC network busses, and an interconnecting apparatus therefor.

Although the methods and apparatus are directed toward different purposes, they are implemented with equipment having the following characteristics in common:

it is connected between two busses of a polyphase AC network or two synchronous polyphase AC transmission networks;

it has at least two branches in parallel whose impedances, having very different values, are subjected to phase-shifted voltages;

it can be constructed from an already existing branch in the network; it is then sufficient to add, in parallel with the existing branch, at least one branch constructed as described hereinafter;

the existing branch, if it is the case, can be either a phase-shifting transformer or not.

1. Description of Related Art

The conventional technique for limiting fault currents in a transformer station consists typically to insert an inductance in series with a cable. However, such an addition of an inductance in series with the cable reduces the transmission capacity of the transformers in the transformer station.

Presently, if a transformer station becomes overloaded and it is impossible to install a transformer in parallel with the existing transformer(s) without for example overloading the network breakers located downstream of the transformer station during faults, the network owner can add a conventional transformer and divide the transformer station and its loads in two groups. The operating flexibility and reliability of the station are however reduced. Alternatively, the network owner can add a conventional transformer and replace all the breakers that can possibly be subjected to overloads during faults. The operating flexibility and reliability are preserved but at a cost that can become prohibitive if a high number of breakers must be changed.

Also known in the art are IPCs (Interphase Power Controllers), which are not designed nor intended for the purpose of enhancing the capacity of a transformer station. IPCs are rather used to force and/or regulate/control a power flow between two busses of a synchronous AC network while ensuring a limitation of the fault currents. IPCs involve the use of at least two reactive elements (a capacitor and an inductor) per phase, the reactive elements being external to and in series with the (phase-shifting) transformer used if necessary. The reactive elements are subjected to separately phase-shifted voltages.

Considering the steady state of transmission lines, improper power flows can depend on their lengths which are too long. In such a situation, series compensation may provide a way to reduce the line impedance and increase the power flow. However, it happens sometimes that the phase angle δ is simply too small to obtain a proper power flow even with series compensation. In such a case, a phase-shifting transformer can be used to obtain a power flow.

Known in the art, there is the document IEEE TRANSACTIONS ON POWER DELIVERY, vol. 8, no. 3, Jul. 1, 1993, pages 1420–1429, XP000403138 NOROOZIAN M. Et al. "POWER FLOW CONTROL BY USE OF CONTROLLABLE SERIES COMPONENTS" which describes a mathematical model for solving power flow control problems and providing information used to construct regions of feasible power flows of control lines. The model is devised for a line compensated by a series capacitor or phase shifter (i.e. a capacitor or a phase-shifter in series with the line). A mathematical formulation of the two fundamental series power flow controllers (controllable series compensation and phase-shifting transformer) have been developed in order to be compatible with load flow calculation programs. To illustrate the approach, a simplified network consisting of two parallel lines and of one power flow controller in series with one of the two lines is used.

Then, a general network model is presented to show that the new modelization allows the simultaneous use of many power flow controllers.

Also known in the art, there is the document YOUSSEF R. D. "PHASE-SHIFTING TRANSFORMERS IN LOAD FLOW AND SHORT-CIRCUIT ANALYSIS: MODELLING AND CONTROL", Jul. 1, 1993, IEEE PROCEEDINGS c. GENERATION, TRANSMISSION, DISTRIBUTION, vol. 140, NR 4 PART C, pp. 331–336, STEVENAGE G. B., which describes a new mathematical model of phase-shifting transformer for load flow and fault analysis programs that can be used to represent accurately the behaviour of electronic phase-shifters.

Power flow control can be achieved using two conventional phase-shifting transformers connected in parallel to obtain transfer levels not attainable with a single phase-shifting transformer. However, since the leakage impedances of the conventional phase-shifting transformers are low, it is essential that they be identical and always adjusted at the same tap position to avoid current flows from one phase-shifting transformer to the other. The parallelling of two conventional phase-shifting transformers does not provide two degrees of freedom to control independently the active power and the reactive powers.

In order to obtain the desired power flow, it is also known in the art to install a conventional phase-shifting transformer in series with a series compensation system to compensate a transmission line (electrically shortening the line) and force a phase angle at its terminals that is different from the phase angle δ that would normally be present. However, as in the previous case, such a system does not provide two degrees of freedom.

The IPC technology offers another manner of controlling the power flow wherever traditionally the phase-shifting transformer technology is considered to increase the power flow in a transmission line. But the presently known IPCs are designed to interconnect networks while decoupling one network from the other, which can be detrimental to the network stability. Consequently, a need arises for an apparatus specifically adapted for transmission line power flow control in order to preserve the inherent synchronizing effect provided by a transmission line, need which is not presently filled.

OBJECTS OF THE INVENTION

It is therefore an object of the invention to provide a method of enhancing capacity of transformer equipment for a polyphase AC network without significant augmentation, or even with reduction of its short-circuit level, and an apparatus thereof, which are of considerable simplicity, reliability and economically advantageous with respect to the prior art.

It is another object of the invention to provide such a method of enhancing capacity and apparatus that can be implemented over an existing transformer station.

It is another object of the invention, in addition to such a capacity enhancement, to provide for an apparatus that can generate or absorb reactive power to contribute to the support of the network voltages, wherein the capacity enhancement is achieved in a completely passive manner.

It is another object of the invention to provide a method of power flow control between two synchronous polyphase AC network busses, and an interconnecting apparatus therefor, which have the faculty to adjust the transfer level of active power between the busses, and which are of considerable simplicity and economically advantageous with respect to the prior art.

It is another object of the invention to provide such a method of power flow control and interconnecting apparatus which, in addition to the active power, have the faculty to adjust the generation or absorption of reactive power in the system in order to provide a support of the line voltages and to increase the transfer capacity of the system above its natural limit or simply to comply with the voltage criteria fixed by the network owner.

It is another object of the invention to provide a method of power flow control and an interconnecting apparatus which are especially adapted to preserve the inherent synchronizing effect provided by a transmission line.

It is another object of the invention to provide such a method that can be applied to uprate a phase-shifting transformer and reduce losses therein, by addition of reactive elements in parallel with it.

SUMMARY OF THE INVENTION

According to the invention, there is provided a transformer apparatus for a polyphase AC network, comprising one or several conventional transformer branches in parallel, each including opposite ends for connection with the AC network and a transformer having a small leakage impedance so that current in the conventional transformer branches produces at the ends thereof a small phase angle $\delta_{sr}$ slightly varying depending on a load level of the AC network characterized in that a constant current transformer branch is connected in parallel with the conventional transformer branches, the constant current transformer branch including a phase-shifting transformer to produce at ends thereof a phase angle $\psi$ substantially greater in absolute value than the phase angle $\delta_{sr}$, and reactive elements in series with the phase-shifting transformer, for increasing an impedance of the constant current transformer branch, the reactive elements being capable to sustain at ends thereof a phase angle equal to $\delta_{sr}-\psi$.

According to the invention, there is also provided a method of enhancing a capacity of transformer equipment for a polyphase AC network, the transformer equipment including one or several conventional transformer branches in parallel, each including opposite ends for connection with the AC network, and a transformer having a small leakage impedance so that current in the conventional transformer branches produces at the ends thereof a small phase angle $\delta_{sr}$ slightly varying depending on a load level of the AC network, the method being characterized in that it comprises the step of:

adding a constant current transformer branch in parallel with the conventional transformer branches, the constant current transformer branch including a phase-shifting transformer to produce at ends thereof a phase angle $\psi$ substantially greater in absolute value than the phase angle $\delta_{sr}$, and reactive elements in series with the phase-shifting transformer, for increasing an impedance of the constant current transformer branch, the reactive elements being capable to sustain at ends thereof a phase angle equal to $\delta_{sr}-\psi$.

According to the invention, there is also provided an interconnecting apparatus for power flow control between two synchronous polyphase AC network busses, characterized in that it comprises:

a first branch having opposite ends for connection respectively with the two AC network busses, the first branch including an adjustable phase-shifting transformer to produce at ends thereof an adjustable phase angle $\psi_1$; and a second branch in parallel with the first branch, including reactive elements to transfer conjointly with the first branch, active power between the two AC network busses depending on the phase angle $\psi_1$.

The second branch may further include in series with the reactive elements, a second adjustable phase-shifting transformer to produce at ends thereof an adjustable phase angle $\psi_2$, the reactive elements having a substantially higher impedance than leakage impedances of the first and second phase-shifting transformers.

According to the invention, there is also provided a method of power flow control between two synchronous polyphase AC network busses, characterized in that it comprises the steps of;

connecting between the two AC network busses, a first branch including an adjustable phase-shifting transformer to produce at ends thereof an adjustable phase angle $\psi_1$;

connecting a second branch in parallel with the first branch, the second branch including reactive elements to transfer conjointly with the first branch, active power between the two AC network busses depending on the phase angle $\psi_1$; and adjusting the phase angle $\psi_1$ for controlling a quantity of active power transferred between the two AC network busses or a quantity of reactive power absorbed or generated by the reactive elements.

The method may comprise the additional steps of:

connecting in series with the reactive elements, a second adjustable phase-shifting transformer to produce at ends thereof an adjustable phase angle $\psi_2$, the reactive elements having a substantially higher impedance than leakage impedances of the first and second phase-shifting transformers (78,86);

adjusting the phase angle $\psi_1$ for mainly controlling a quantity of active power transferred between the two synchronous AC network busses; and adjusting the phase angle $\psi_2$ for mainly controlling a quantity of reactive power generated or absorbed by the reactive elements.

BRIEF DESCRIPTION OF THE DRAWINGS

In order to impart full understanding of the manner in which these and other objectives are attained in accordance with the present invention, preferred embodiments thereof are described hereinafter with reference to the accompanying drawings wherein.

DESCRIPTION OF THE PREFERRED EMBODIMENTS

Figure 1:
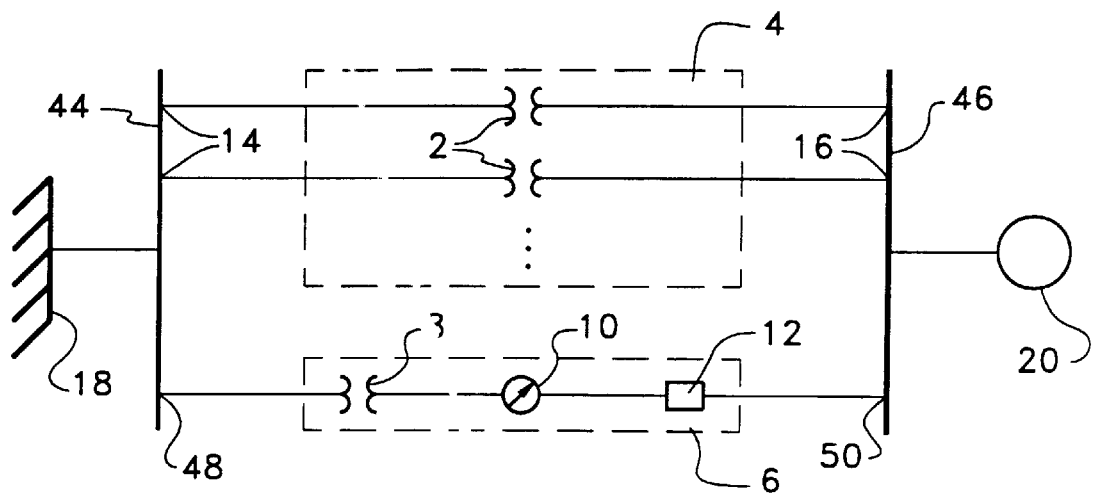
FIG. 1 shows a schematic diagram of a transformer station according to the invention.

In the following description and in the drawings, like reference characters refer to like or corresponding parts throughout the several views.

The two methods and apparatuses hereinbelow described allow to achieve classical functions relative to networks in a novel and original manner.

The following section relates to the method of enhancing capacity of transformer equipment for a polyphase AC network without augmentation of its short-circuit level, and the apparatus thereof.

Referring to FIG. 1, there is shown a schematic diagram of a transformer station whose short-circuit level is lower to what it would be if constructed only with conventional transformers. The transformer station is made of;

one or several transformers 2 in parallel. In the following description, the combination of these transformers 2 is represented by an equivalent circuit branch referred to as the conventional transformer branch 4;

one branch 6, in parallel with the conventional transformer branch 4, comprising an optional transformer 8 (for step down purposes) and a phase-shifting transformer 10 in series with a reactive (inductive or capacitive) element 12 which is intended to increase the impedance of the branch 6. The combination of this branch 6 is represented by an equivalent circuit branch hereinafter referred to as the constant current transformer branch, or simply the constant current transformer.

In order to fulfil the objectives of the invention according to the method herein described, the constant current transformer branch 6 must necessarily be installed in parallel with the conventional transformer branch 4 and it is this combination that forms the system herein described.

The term "station" is herein used in a very large sense; it designates any installation, of any dimension, where transformers operate in parallel. The case of transformer stations in AC networks constitutes a privileged application for the equipment herein described (with however no limitation in this respect).

In FIG. 1, the environment of the transformer station is represented by an infinite bus 18 and an equivalent network or load 20.

In normal operation, the current in the conventional transformer branch 4 produces at the ends thereof a phase angle $\delta_{sr}$ between the voltages at its terminals 14, 16 that varies with the load level, due to the equivalent leakage impedance of the conventional transformers 2. However, this phase angle remains small because the equivalent leakage impedance is small. The phase angle applied at the terminals of the reactive element 12 of the constant current transformer 6 is equal to the sum of $\delta_{sr}$ minus the phase angle $\psi$ of the phase-shifting element of this branch. Since $\psi$ is much greater in absolute value than the phase angle $\delta_{sr}$, the variations of $\delta_{sr}$ with the load current affect very little the phase angle $\delta_{sr}-\psi$ and the current in the constant current transformer branch 6 varies little whatever the load level in comparison with the current variation in the conventional transformer branch 4. Since the current in the constant current transformer branch 6 varies little, this equivalent transformer can also be qualified as a constant power transformer.

In short-circuit operation, when the reactive element 12 is an inductor, this inductor is selected so that the short-circuit current has the same order of magnitude as the load current in this branch 6; this current is thus far smaller than the short-circuit current of the conventional transformer branch 4 and the total short-circuit current of both branches 4, 6 does not increase significatively with the paralleling of the two branches 4, 6. For this reason, it is possible to say here that the apparatus herein described enhances the capacity of transformation without increasing the short-circuit level.

When the reactive element 12 is a capacitor, this capacitor is chosen so that its short-circuit current has the same order of magnitude or is greater than the load current in this branch 6. Since this current is, at the time of a fault, phase-shifted by almost 180° with respect to the short-circuit current in the conventional transformer branch 4, the total short-circuit current of both branches 4, 6 is reduced. Thus, the apparatus herein described enhances the transformation capacity of the station while reducing the short-circuit level.

Whether the reactive element 12 of the constant current transformer branch 6 is inductive or capacitive, the series impedance of the constant current transformer 6 is always much greater than the series impedance of a conventional transformer 4. Indeed, during a fault, the constant current transformer 6 is subjected to the phase-to-ground voltage of the network 20 and its series impedance must therefore be higher than the impedance of a conventional transformer 4 in order that the current in the series impedance has the same level as the load current. For this reason, the constant current transformer 6 is said to have a high impedance with respect to a conventional transformer 4.

The phase angle $\delta_{sr}-\psi$ between the terminals of the reactive element 12 of the constant current transformer 6 implies that this element 12 absorbs or generates reactive power depending on whether this element 12 is inductive or capacitive respectively. It is thus possible to choose the value of reactive power absorbed or generated by this branch 6. As for the active power, the reactive power remains relatively constant whatever the level of current flowing through the conventional transformers 2. In normal operation, the power factor of the constant current transformer 6 is thus fairly constant.

In the case where the conventional transformer branch 4 is already energized and the constant current transformer branch 6 is then switched in service, the constant current transformer 6 relieves the conventional transformers 2 in current and in power, and the phase angle $\delta_{sr}$ slightly varies.

In normal operation, the fact that the non-conventional branch 6 is different from the conventional transformer branch 4 is thus invisible by the network 20 from the standpoint of active power. It is during a fault that the effect of the non-conventional branch 6 appears. At this time, the non-conventional branch 6 supplies the fault by means of a current having a value that is determined by the network voltage and the series impedance of the non-conventional branch 6. For this reason, among the properties of constant current, constant power, high impedance and constant power factor, it is the property of constant current that is retained in this text to characterize the non-conventional branch 6.

The current in the constant current transformer branch 6 has therefore predetermined values during normal and short-circuit operation. Both values can be different or similar depending on the parameters of the system.

The possibility of enhancing the capacity of an existing transformer station best illustrates the advantages that can bring the addition of a constant current transformer 6 in parallel with conventional transformers 2.

Figure 2:
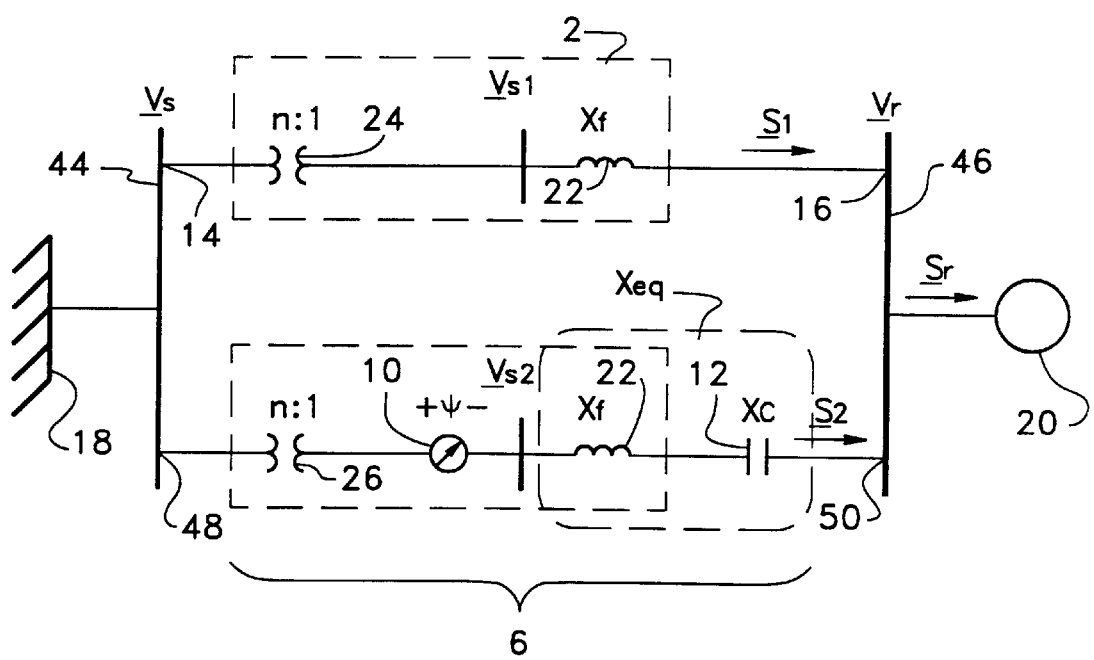
FIG. 2 shows a schematic diagram of a transformer station according to the invention, wherein the series impedance of the constant current transformer branch is purely capacitive.

Referring to FIG. 2, there is shown a schematic diagram of a transformer station equipped with a conventional transformer 2 in parallel with a constant current transformer 6. The reactance $X_f$ corresponds to the leakage impedances 22 of the conventional transformer 2 and of the phase-shifting transformer 10 in the constant current transformer branch 6. The reactance $X_{eq}$ represents the sum of the impedances 12, 22 of the constant current transformer branch 6. In the particular case of FIG. 2, the impedance 12 of the constant current transformer 6 is purely capacitive. The transformer 24 (which may provide step down features) depicts the ideal part of the conventional transformer 2, while the transformer 26 depicts the ideal part of an optional step down transformer in the constant current branch 6. The phase-shifting transformer 10 and the step down transformer 26 may conveniently be combined in a single transformer providing both functions.

The values:

| | | |
|---|---|---|
| $V_b$ = 120 kV, | $S_{3\phi}b$ = 100 MW, | $Zyb$ = 144 Ω, |
| $X_f$ = 0.1 p.u., | $X_C$ = 0.511 p.u., | n = 2.63, |
| $\psi$ = 30°, | $\underline{V}_r$ = 1∠0°, | $\underline{V}_s1$ = 1∠5.74°, |
| $\underline{V}_{s2}$ = 1∠-24.26°, | $\underline{V}_s$ = 2.63∠5.74°, | $\underline{S}_1$ = 1 - j0.05, |
| $\underline{S}_2$ = 1 + j0.215, | and $\underline{S}_r$ = 2 + j0.165 | | are typical of a 315/120 kV transformer station across which a total of 200 MW transfer. As shown in FIG. 2, the transformer station delivers 16.5 MVars on the receiving side. Since the voltages are equal on both sides of the station, it also delivers 16.5 MVars on the source side.

Figure 3:
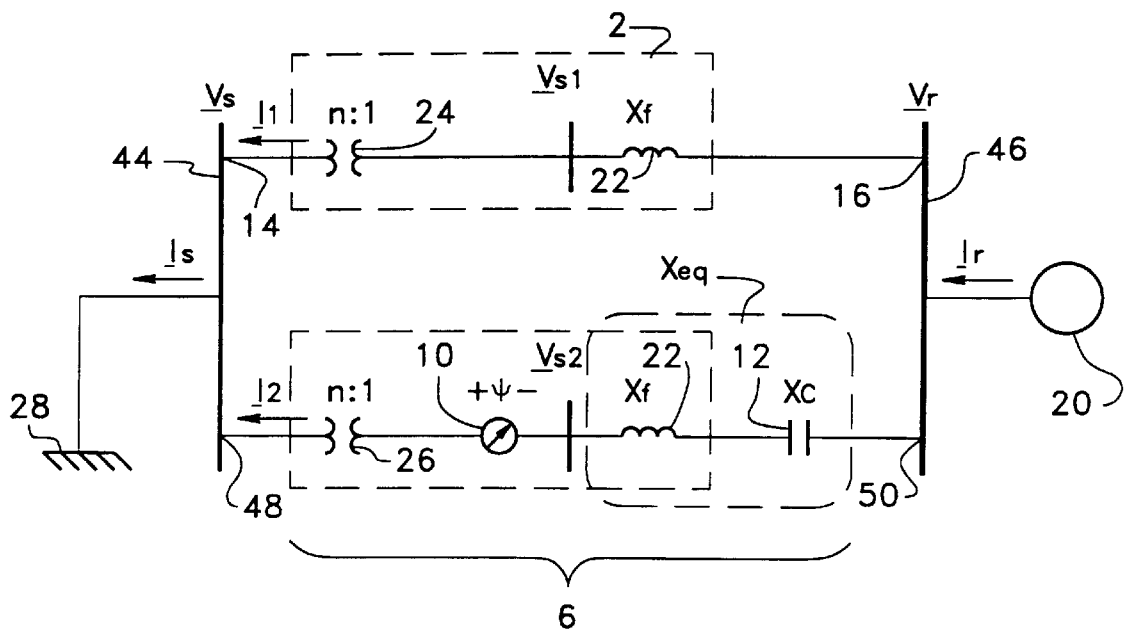
FIGS. 3 and 4 show schematic diagrams illustrating the behavior of the transformer station shown in FIG. 2, when subjected to a fault on the source side and a fault on the receiving side respectively.
Figure 4:
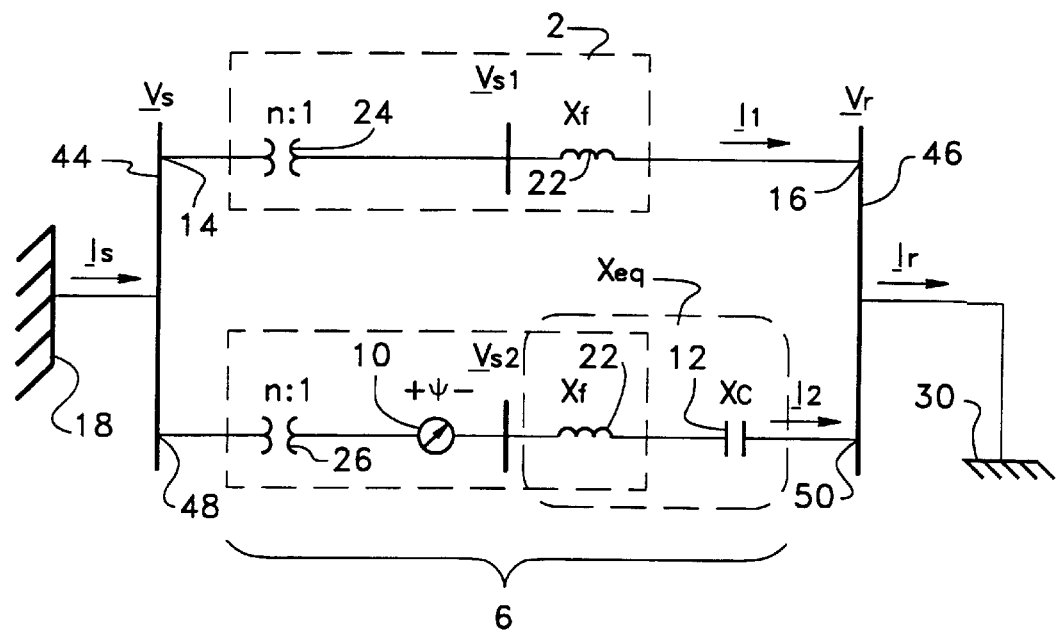

Referring to FIGS. 3 and 4, there is illustrated the behavior of the transformer station shown in FIG. 2, when subjected respectively to a fault 28 on the source side and a fault 30 on the receiving side. In the case of FIG. 3, due to the fault 28:

$V_s$=0, $I_s$=3.04∠-98.76°, $I_1$=3.8∠-90°, $I_2$=0.93∠120°, $I_r$=7.57∠-90°.

In the case of FIG. 4, due to the fault 30:

$V_r$=0, $I_s$=1.09∠-84.26°, $I_1$=3.8∠-84.26°, $I_2$=0.93∠65.74°, $I_r$=3.04∠-75.5°.

From the above results, it can be demonstrated that the total fault current with an installation comprising a conventional transformer 2 and a constant current transformer 6 is around 40% of what it would be with a pair of conventional transformers and around 80% of what it would be with a single conventional transformer.

In the case where the constant current transformer 6 is connected in parallel with several conventional transformers 2 instead of one as herein described, the percentages obtained here will naturally be higher but there will always be a reduction of the fault currents.

Thus, the method and system herein described enhance the capacity of a transformer station while avoiding overload of the downstream or upstream equipment current during the faults.

Figure 5A:
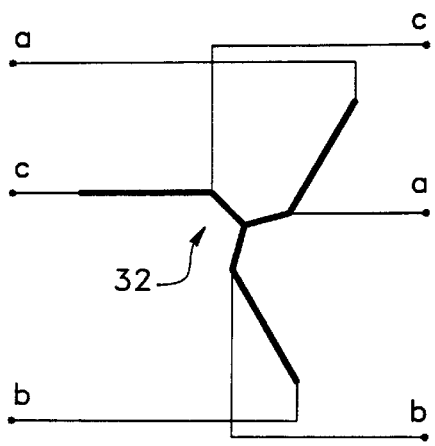
FIGS. 5A to 5E show schematic diagrams of phase-shifting transformers according to the invention, for producing the phase shift and, when required, a change in the voltage level.
Figure 5B:
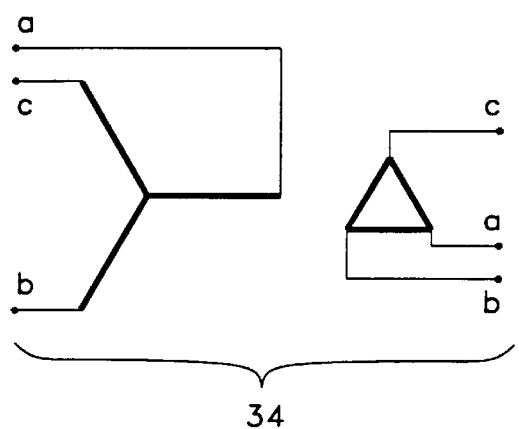
Figure 5C:
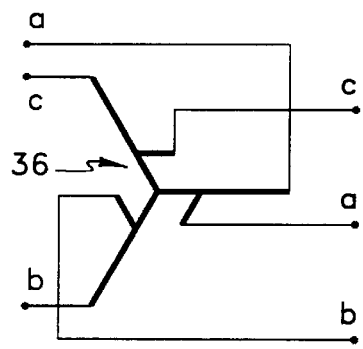
Figure 5D:
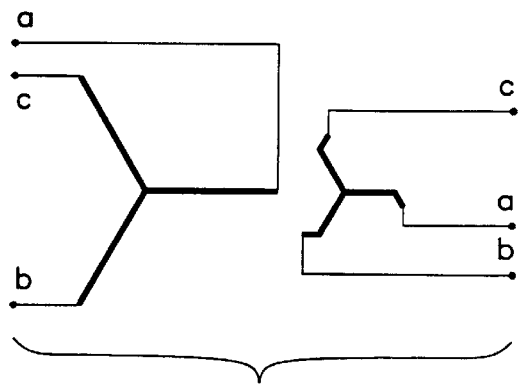
Figure 5E:
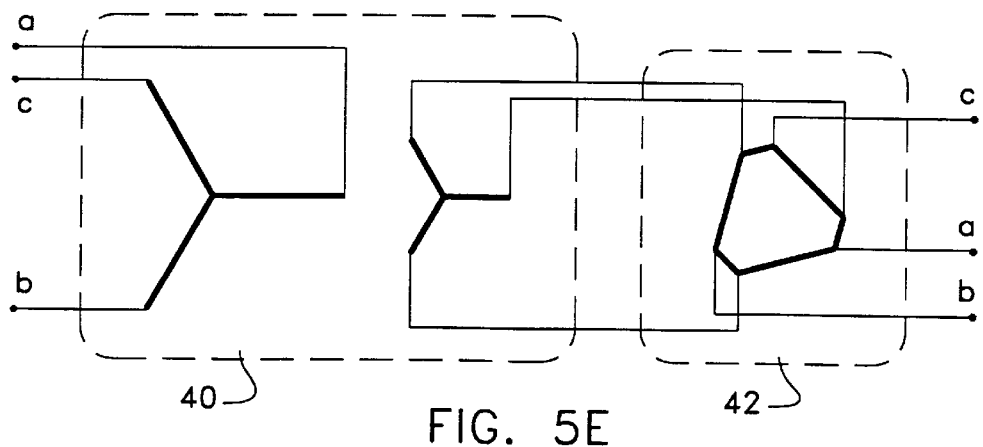

The phase-shifting transformer 10 of the constant current transformer 6 must produce a phase-shift $\psi$ and, when required, a change in the voltage level at its terminals. These two functions can be achieved in multiple ways, as shown in FIGS. 5A to 5E which illustrate several transformer configurations achieving this purpose. FIG. 5A represents a zigzag combined step down and phase-shifting transformer configuration 32. FIG. 5B represents a Y-Δ combined step down and phase-shifting transformer configuration 34. FIG. 5C represents a combined step down and phase-shifting autotransformer configuration 36. FIG. 5D represents a Y-zigzag combined step down and phase-shifting transformer configuration 38. FIG. 5E represents a Y—Y step down transformer configuration 40 and a squashed-delta phase-shifting transformer configuration 42. Although not illustrated, the two functions of these transformer configurations can be made adjustable for example by means of mechanical or electronic tap changers so that the apparatus may be adapted to the network requirement. To further enhance the apparatus flexibility, the impedance 12 of the constant current transformer 6 (as shown in FIG. 1) can be provided with mechanical or electronic means for varying its value or even changing its nature (inductive or capacitive).

Referring back to FIG. 1, the present apparatus is entirely passive. It requires no external signal nor any operation for limiting the fault current when a fault occurs. It is thus completely different from the active systems presently existing or in development for limiting fault currents.

The constant current transformer 6 shares some similarities with the following technologies, without however being implemented in the same way.

The present apparatus differs from the conventional technique for limiting fault currents consisting typically to insert an inductance in series with a cable. In respect with the design of the present apparatus, in addition to a reactive element 6, as for the cables, there is a phase-shifting element 10 that is added in series with the reactance 6. Furthermore, from normal operation standpoint, the simple addition of a reactive element is not as advantageous as the addition of a phase-shifting element 10 in series with the reactive element 12, as in the present case. Indeed, the addition of an inductance in series with the cable reduces the transmission capacity whereas the present apparatus, by means of the phase-shifting element 10, allows to sustain or even increase, if need be, the transfer level through the transformer station.

The method for enhancing the capacity of a transformer station involves the connection of at least two circuit branches 2, 6 in parallel, between two network busses 44, 46, wherein the impedances of the branches 2, 6 are subjected to voltages that are not in phase. In that sense, it shares certain similarities with a particular case of an IPC (Interphase Power Controller) that would be constructed as follows: the inductive branch would comprise a conventional transformer and a very small inductance whose role would be fulfilled by the leakage inductance of the transformer itself, while the capacitive branch would comprise a phase-shifting transformer, in series with a capacitor, as for a constant current transformer as herein described.

However, the present art relating to the IPCs always involves at least two reactive elements external to and in series with the (phase-shifting) transformer used if necessary. Furthermore, the purpose of an IPC is completely different from the purpose of the present apparatus. An IPC is used to force a constant power flow between two busses of a synchronous network while ensuring a limitation of the fault currents whereas the present apparatus does not regulate at all the power between the two busses 44, 46 to which it is connected. It simply provides the possibility to implement a transformer station whose short-circuit level is lower than what it would be with conventional transformers only and this, without significant increase of the short-circuit level.

Thus, according to the invention, if a transformer station becomes overloaded, the network owner can install, in parallel with the existing transformer(s) 2, a constant current transformer 6 as herein described. The operating flexibility is preserved and the apparatus can contribute to the voltage support for a minimal additional cost, which is the cost of the impedance 12 of the constant current transformer branch 6.

The present apparatus thus constitutes a very interesting new tool for enhancing or preserving the performance and the operating flexibility of a network.

The conventional transformer branch 4 is absolutely required in parallel with the constant current transformer branch 6 to maintain the phase angle δ between its terminals 48, 50 at an almost constant and very low value.

On one hand, without the conventional transformer(s) 2 in parallel, the phase angle δ can increase substantially and the constant current property is lost. This results in important variations of reactive power generated or absorbed by the apparatus which can cause unacceptable voltage variations.

On the other hand, since the apparatus is optimized to operate only with a small phase angle δ, the presence of the conventional transformer branch 4 ensures that the constant current transformer 6 will not be stressed by voltages or currents too important.

For these reasons, the network owner must always make sure of leaving at least one conventional transformer 2 in parallel with the constant current transformer 6.

In the case where the constant current transformer 6 generates an excessive amount of reactive power during low load conditions and this causes overvoltages, it is possible to operate the constant current transformer 6 only during the peak periods or to provide suitable reactive power compensation.

In the basic topology, the constant current transformer branch 6 comprises only one reactive impedance 12. The transfer of active power through the constant current transformer 6 can thus only take place with some generation or absorption of reactive power depending on whether the nature of the impedance 12 is capacitive or inductive. In certain cases, this substantial generation or absorption of reactive power can possibly cause a network operation problem.

Of course, this situation can always be corrected by installing shunt compensation. But since a shunt or series compensation requires a current flow in a reactive impedance anyway, it is then more advantageous to use this current to carry an additional quantity of active power, thus relieving one or several transformers. The dimensioning of these transformers is then reduced as well.

Figure 6:
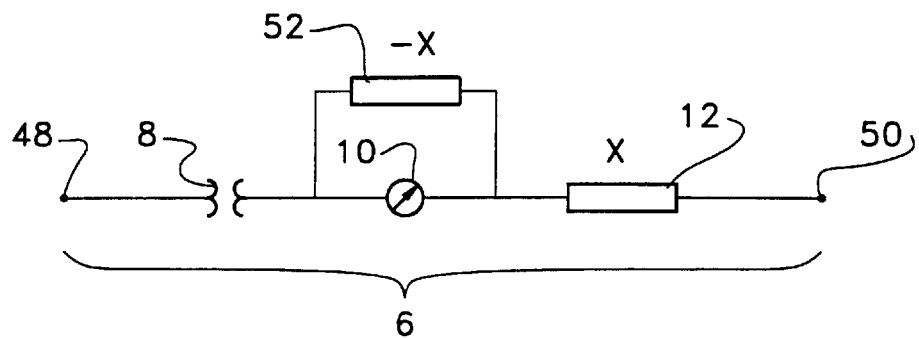
FIG. 6 shows a schematic diagram of a constant current transformer branch according to the invention, with compensation.

Referring to FIG. 6, there is shown a schematic diagram illustrating the general principle of the compensation applied to the constant current transformer branch 6. Here, two components are relieved: the phase-shifter 10, because most of the current now flows through the compensation impedance 52; and the step-down transformer 8, because the power factor that it perceives is increased.

In addition to illustrating the principle, FIG. 6 also shows how it can be applied when a phase-shifting transformer 10 distinct from the step-down transformer 8 is used.

Figure 7:
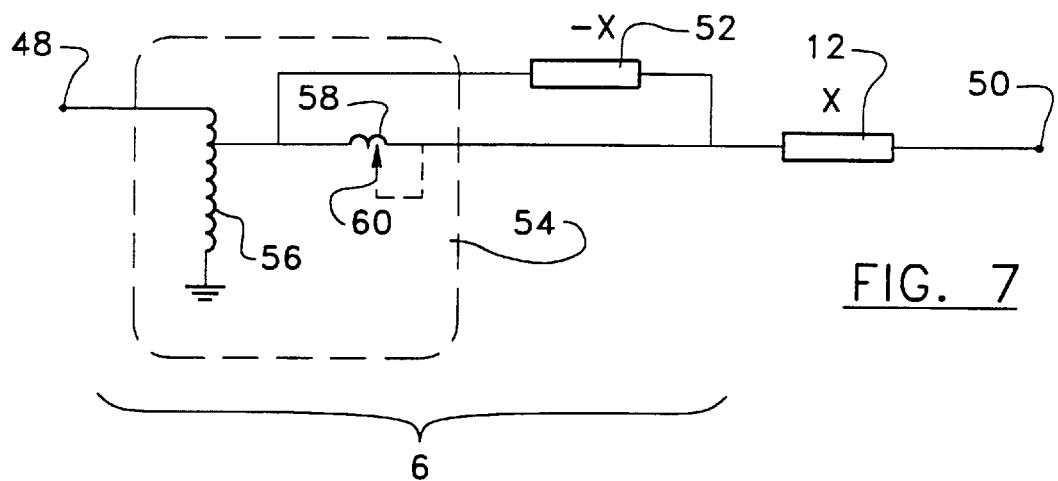
FIG. 7 shows a schematic diagram of a constant current transformer branch according to the invention, wherein a single transformer fulfils the voltage step-down and phase-shifting functions.

Referring to FIG. 7, there is shown another example of the apparatus, wherein a single polyphase transformer 54 fulfils the voltage step-down and phase-shifting functions. For each phase of the AC network, the transformer 54 has a first winding 56 fulfilling the step down function, to which is connected another winding 58 belonging to another phase, to provide a phase shift. The power flow can be adjusted using an optional tap changer 60.

Figure 8A:
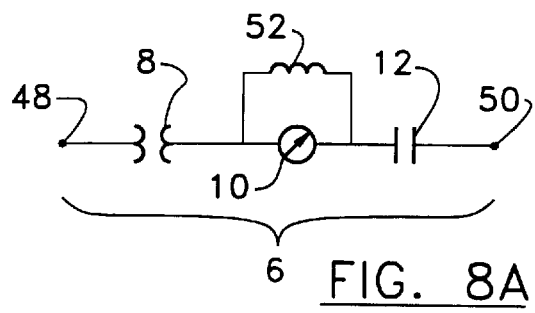
FIGS. 8A and 8B show schematic diagrams illustrating constant current transformer branches according to the invention, with compensation.
Figure 8B:
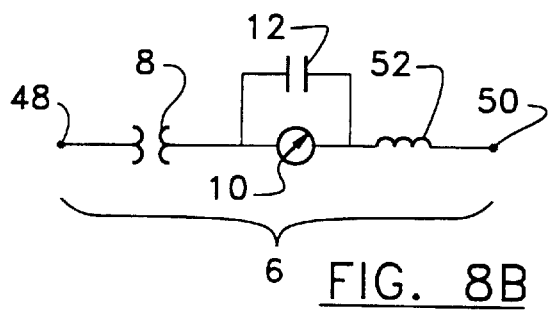

Referring to FIGS. 8A and 8B, there are shown different ways to apply the compensation principle introduced in FIG. 6.

Figure 9:
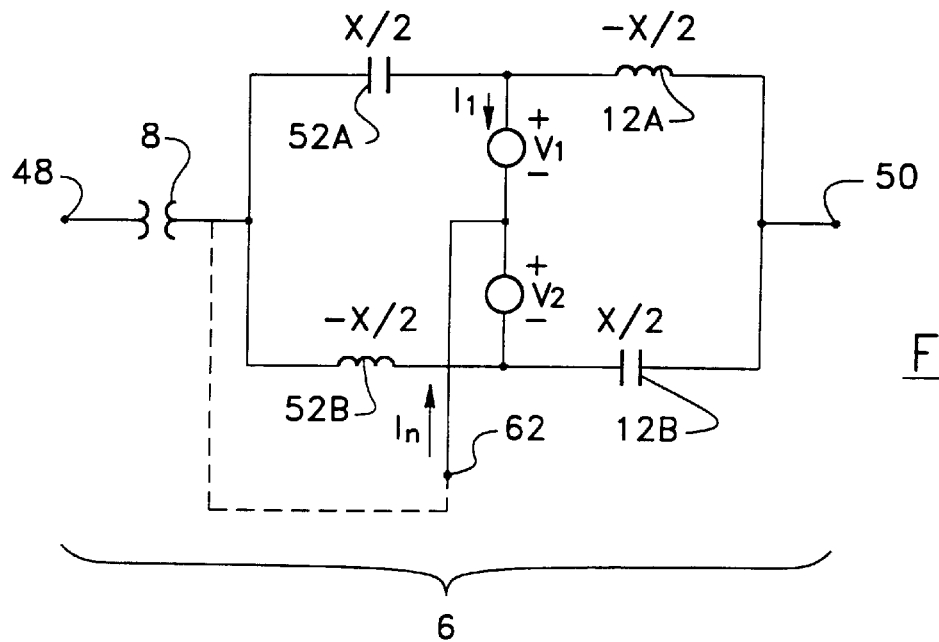
FIG. 9 shows a schematic diagram of a constant current transformer branch according to the invention, wherein different reactive elements are combined.

Referring to FIG. 9, there is shown another variant of the apparatus. In this variant, different reactive elements 12A, 12B, 52A, 52B are combined to reduce the global reactive power generated or absorbed. The phase-shift required to force the reactive elements 12A, 12B, 52A, 52B to transmit active power is provided by the voltage injected in the median branch where the equivalent sources $V_1$ and $V_2$ are located. Moreover, when the voltage phase angle across the terminals 48, 50 of the constant current transformer branch 6 is nil (or very low), the current (e.g. $I_1$) provided by $V_1$ and $V_2$ is practically nil. Hence, very low power sources are sufficient for the good operation of the circuit. In the case where the reactive elements 12A, 12B, 52A, 52B form a conjugated pair of impedances, a reference potential applied to an internal node reference terminal 62 is required to avoid any indetermination within the circuit voltages (floating with respect to the ground).

Figure 10:
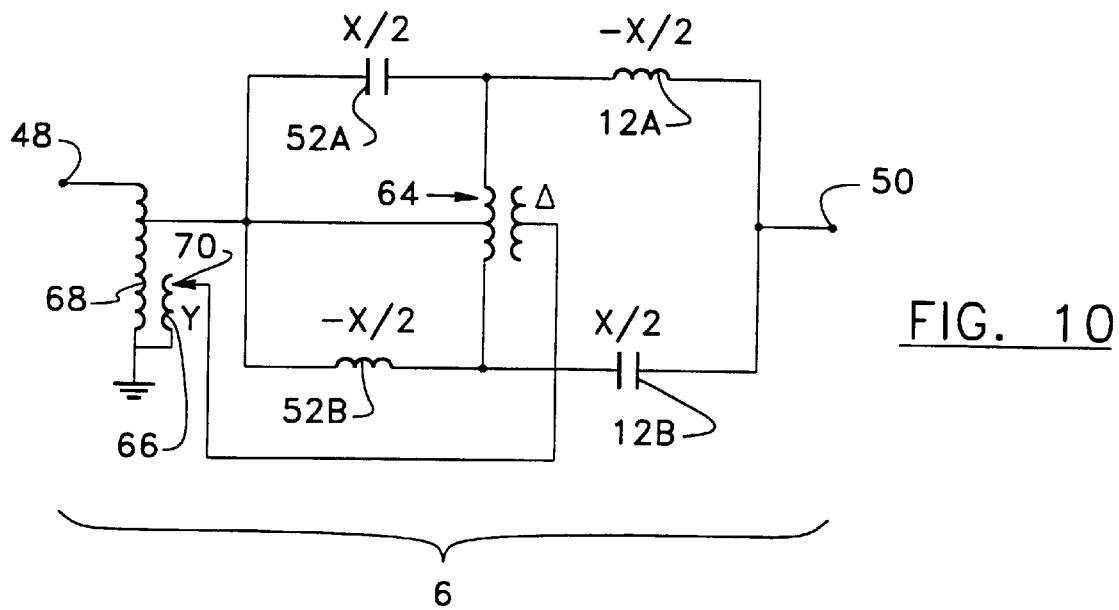
FIG. 10 shows a schematic diagram of a constant current transformer branch according to the invention, wherein a small series transformer is used.

Referring to FIG. 10, there is shown an implementation of the aforesaid variant, wherein the sources $V_1$ and $V_2$ are supplied by a small series transformer 64, which is fed from an additional winding 66 of the principal transformer 68. A tap changer 70 can be used to change the power level by varying the voltage injected by the series transformer 64. The low voltage side of the series transformer 64 is Δ-connected in order that the voltages $V_1$ and $V_2$ are in quadrature with the phase-to-ground voltage at the branch input. Indeed, such an injection in quadrature performs a voltage phase-shift. The additional winding 66 of the principal transformer 68 is Y-connected to provide the appropriate excitation signal to the series transformer 64.

The following section relates to the method of power flow control between two synchronous polyphase AC network busses, and the interconnecting apparatus therefor.

Figure 14:
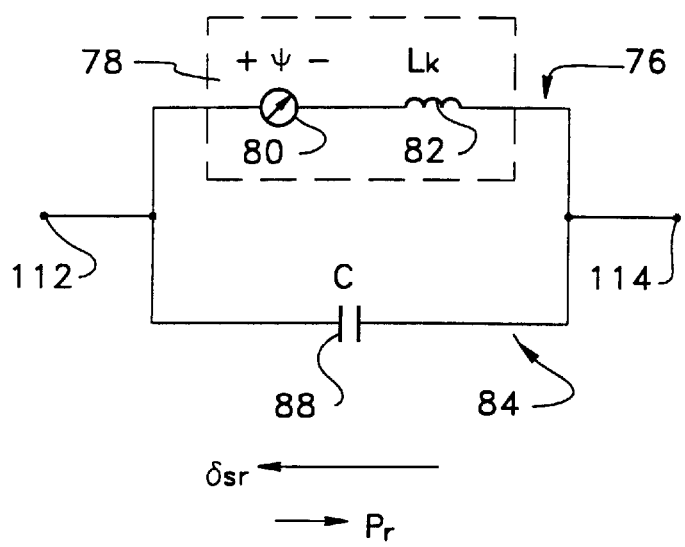
FIG. 14 shows a schematic diagram of a power flow control apparatus according to the invention.

Referring to FIG. 14, there is shown a schematic diagram of a power flow control apparatus according to the invention. The apparatus comprises a conventional phase-shifting transformer 78 in parallel with a capacitor 88. For the case where $\delta_{sr}$ and $P_r$ are of opposite sign, the capacitor 88 offers the following benefits without altering the power flow control capabilities of the phase-shifting transformer 78:

current in the phase-shifting transformer 78. is significantly reduced at high power level since the capacitor 88 is then handling most of the line current; and losses in the phase-shifting transformer 78 are consequently much smaller.

The reduction of the current stresses in the phase-shifting transformer 78 can then be used to either:

considerably increase the power capabilities of an existing phase-shifting transformer both in the modes of operation where it is limited by its current capability or its maximum phase shift; or control a nominal power transfer with a smaller phase-shifting transformer at a smaller overall cost that would do an installation using only a phase-shifting transformer.

Moreover, the capacitor 88 produces reactive power that provides voltage support on both sides of the apparatus as opposed to a phase-shifting transformer used alone, which absorbs reactive power.

The principle involved in the design of the power flow control apparatus can be explained with reference to a conventional generic Interphase Power Controller (IPC). The basic elements of such a generic IPC are an inductor and a capacitor subjected to separately phase-shifted voltages produced by corresponding phase-shifting transformers.

The present invention can conveniently be used to increase the power flow in a transmission line. In this context, the inductor and the phase-shifting transformer in series with the capacitor of a generic IPC can be removed, for the reasons hereinafter explained. The inductor is removed to preserve the coupling effect of the line between its terminals. The only inductance remaining in the branch 76 is the leakage impedance $L_k$ (also denoted by numeral 82) of the phase-shifting transformer 78, numeral 80 representing the ideal part of the phase-shifting transformer 78. It should be understood that the leakage impedance 82, although herein mentioned because it is normally inherent to structures involving windings as the phase-shifting transformer 78, does not provide any desirable effect nor fulfils any intended purpose in relation with the invention. It is in no way essential to the behaviour of the invention whose description could be made without it. The phase angle δ condition typically imposed by the network insures that the capacitor 88 will always work efficiently with the phase-shifting transformer 78 at high power transfer level.

The withdrawing of the inductor of a generic IPC is best understood by considering the extreme case where the inductor becomes large enough to make the inductive impedance complex conjugated with the capacitor impedance. Then, the IPC works like a current source and the power flowing through is independent of the phase angle $\delta_{sr}$. With only the small inductor $L_k$ as in the present case, the insertion of the apparatus in series with a transmission line does not affect significantly the coupling effect of the transmission line and therefore, the power varies greatly with the phase angle $\delta_{sr}$.

Consequently, the design and purpose of the invention is different from the presently known IPC technology.

The capacitor 88 and the phase-shifting transformer 78 work in parallel in a similar manner to the capacitor 12 and the phase-shifting transformer 10 of FIG. 8B. However, the phase-shifting transformer 10 has a phase shift ψ that can be fixed or variable over a limited angle range as compared to the phase shift, ψ of the apparatus shown in FIG. 14. Incidentally, the demonstration of the benefits provided by the capacitor 88 across the phase-shifting transformer 78 whose phase angle can vary over ±60° is in no way obvious. Although the invention has a simple implementation, it took extensive network studies to demonstrate its compatibility to the network requirements. The unexpected aspect here is that the capacitor 88 can be kept constant while both the network and the phase-shifting transformer 78 can vary greatly. This constant capacitor property is of prime importance at high-voltage levels for network reliability and cost competitiveness.

Figure 15:
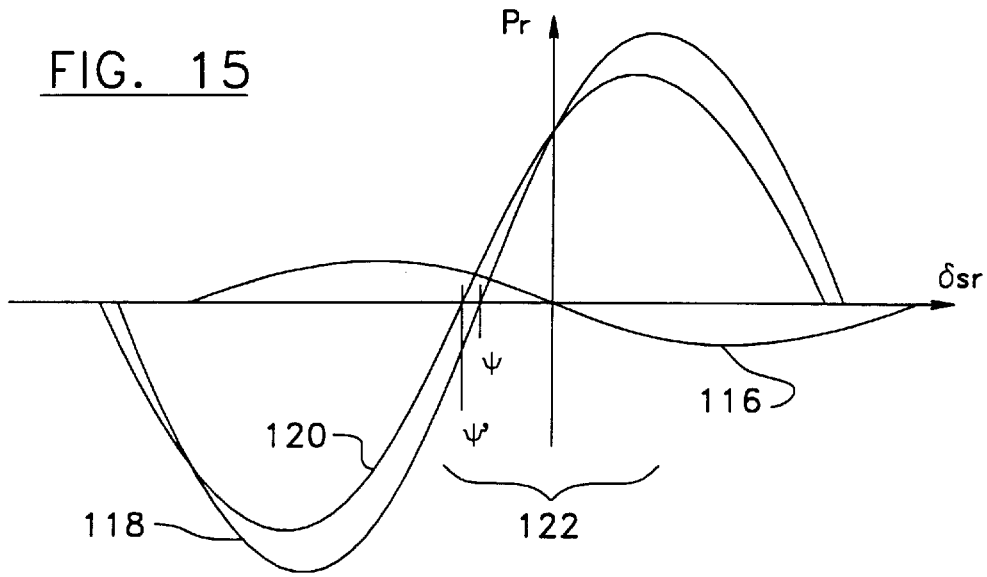
FIG. 15 shows a graph of the power characteristics of the power flow control apparatus shown in FIG. 14, as a function of the phase angle across its terminals.

Referring to FIG. 15, there are shown the power characteristics of the power flow control apparatus according to the invention, and of its two branches 76, 84, as a function of the phase angle $\delta_{sr}$ across the apparatus terminals 112, 114. As shown, the capacitive impedance 88 derived from curve 116 is much higher than the phase-shifting transformer leakage impedance 82 derived from curve 118. The overall apparatus characteristic represented by curve 120 and resulting from the addition of the branches characteristics 116, 118 is then mostly dictated by the phase-shifting transformer 78. It turns out that a phase shift ψ produced by the phase-shifting transformer 78 will be seen as a phase shift ψ' by the network, in the region of interest 122. Thus, the addition of the capacitor 88 enlarges the power flow control range of the phase-shifting transformer 78.

Figure 16:
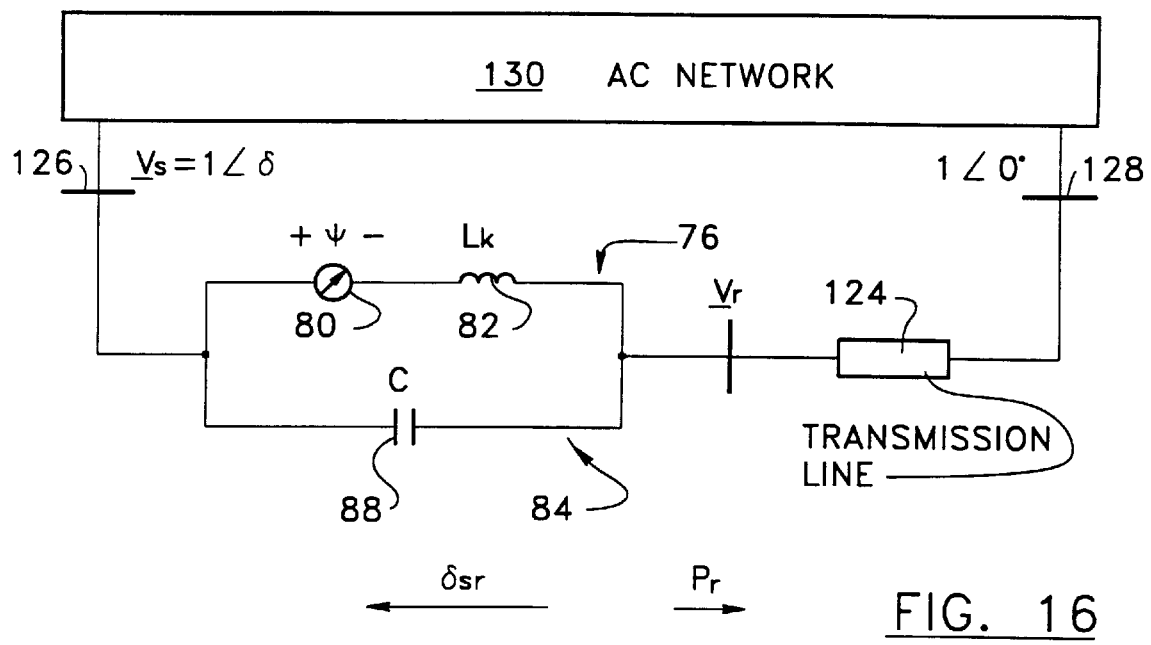
FIG. 16 shows a schematic diagram of a simplified AC network with a power flow control apparatus as shown in FIG. 14.

Referring to FIG. 16, there is shown a simplified network representation illustrating the power flow control capability of the apparatus installed at the sending end of a transmission line 124. The apparatus and the line are connected to two infinite busses 126, 128 of the AC network 130.

The following description relates to a non-limitative example of the apparatus according to the invention with a 500 kV transmission line represented only by a series reactance $X_L$. Shunt admittances and losses are neglected here since they only slightly influence the power flow. The phase-shifting transformer 78 is of Mersereau type whose transformers each exhibits a 15.9% impedance. The phase-shifting transformer 78 can vary ψ between ±25°, which makes $X_{Lk}$ varying between 0.0117 to 0.0228 p.u. The power basis is 100 MW.

Figure 17A:
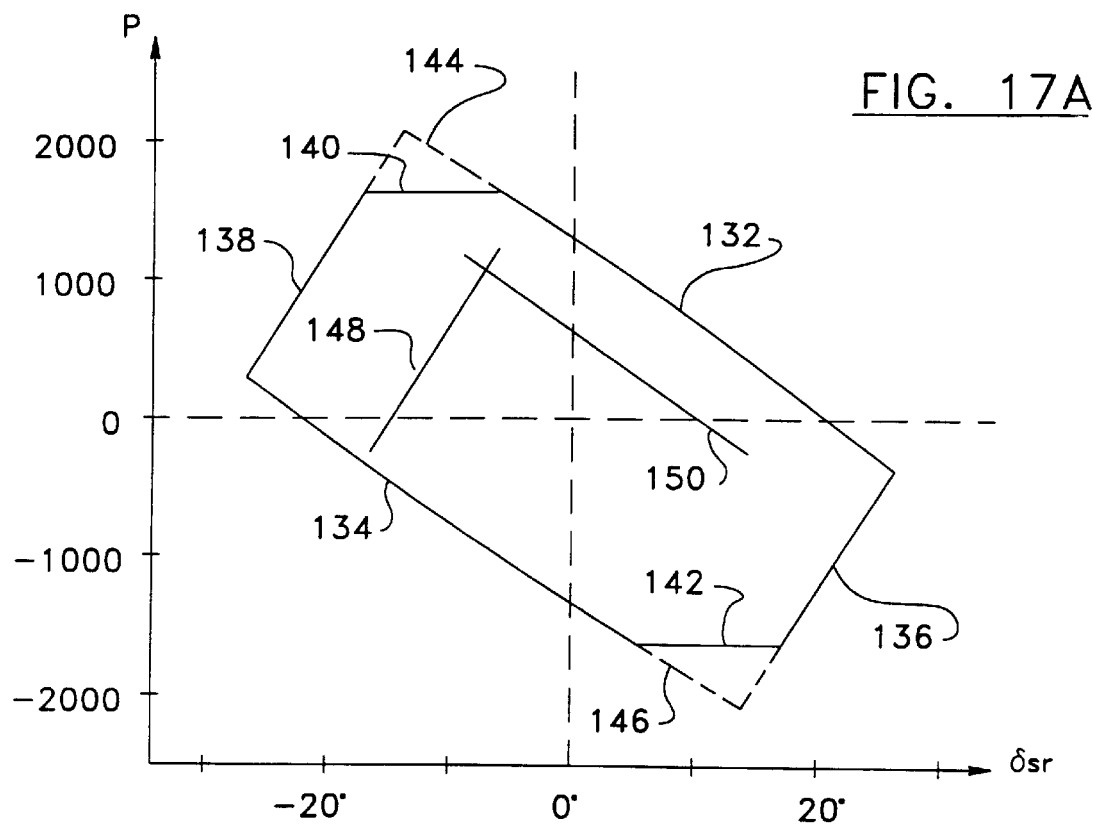
FIGS. 17A and 17B respectively show graphs of the power characteristics of a phase-shifting transformer and a power flow control apparatus as shown in FIG. 14 as a function of the phase angle difference between the source and receiver voltages.
Figure 17B:
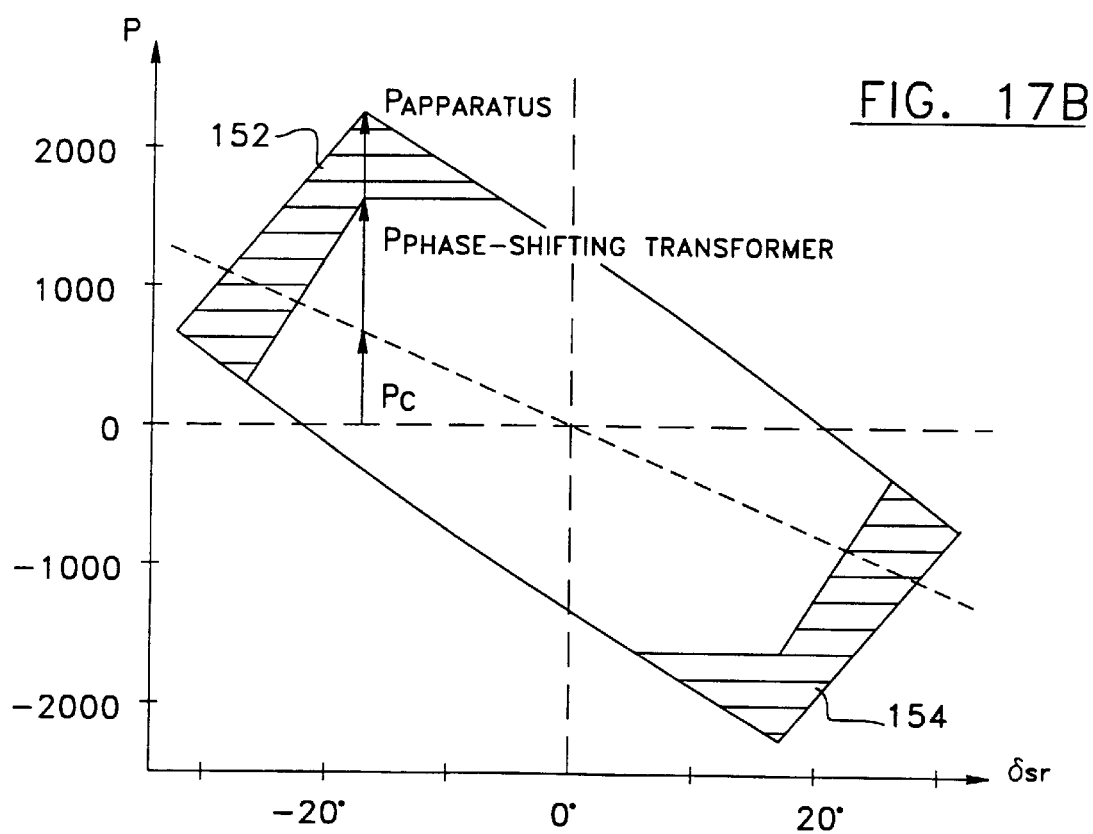
Figure 17C:
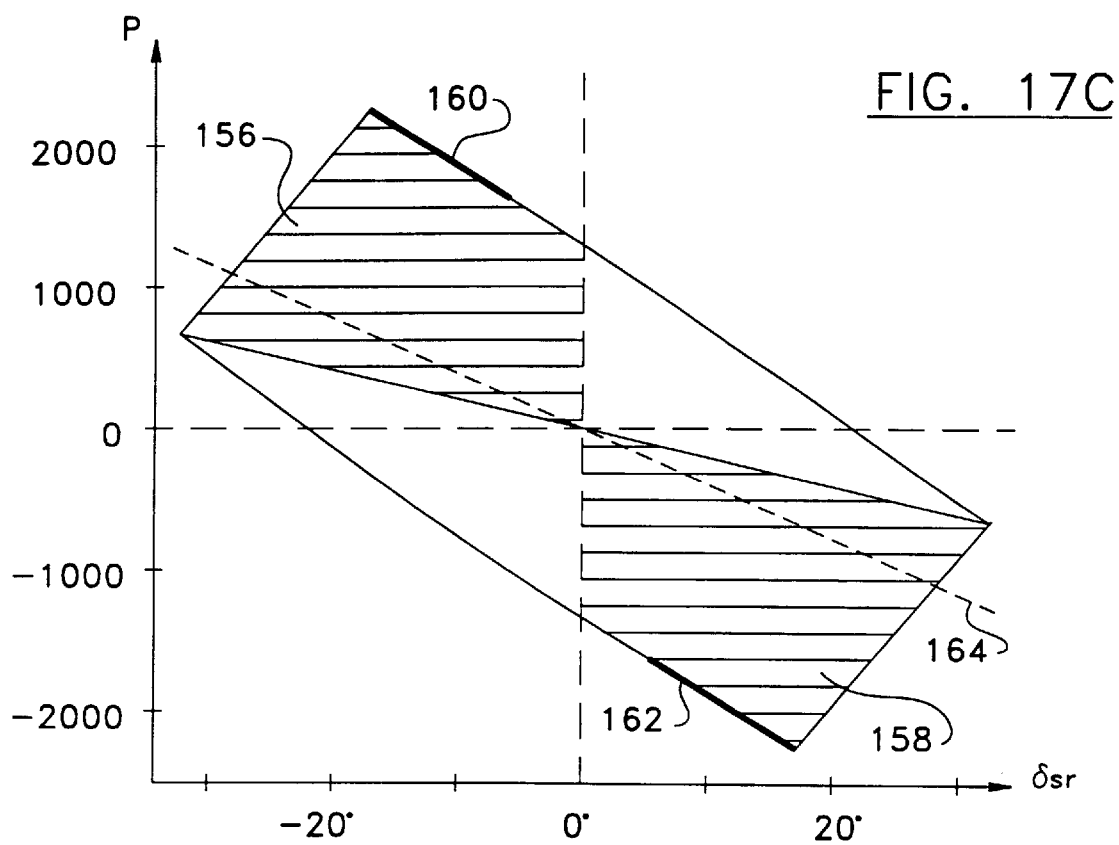
FIG. 17C shows the two areas of operation at reduced losses inside the power characteristic of a power flow control apparatus as shown in FIG. 14, as a function of the phase angle difference between the source and receiver voltages.

Referring to FIG. 17A to 17C, there are shown comparison results between the apparatus according to the invention and the phase-shifting transformer 78 when used alone. The results are plotted as a function of $\delta_{sr}$ (the phase angle difference between $V_s$ and $V_r$ as shown in FIG. 16) instead of δ (the phase angle difference imposed by the AC network 130 across the transmission line 124) as normally done, which constitutes a very effective approach for the power flow study of the apparatus since on the P-$\delta_{sr}$ plane, the apparatus and network limits are represented by straight lines whose slope m are almost constant and easy to calculate. Furthermore, comprehension of the apparatus, developed as a function of $\delta_{sr}$, can be readily used in real network since $\delta_s$r, imposed by the apparatus, is easy to vary whereas $\delta$ variations may be cumbersome to obtain. The following description of the phase-shifting transformer 78 indicates how to interpret the P-$\delta_{sr}$ plane.

Referring in particular to FIG. 17A, there is shown a graph of the P-δsrworking area of the phase-shifting transformer 78 alone, in solid lines. This working area is delimited by three factors:

the dispatch conditions and the contingencies imposed by the network 130 represented by a δ variation of ±20° (lines 132 and 134);

the maximum phase shift of the phase-shifting transformer 78 (lines 136 and 138); and the maximum winding current of the phase-shifting transformer 78 (lines 140 and 142).

Without the current limit, the phase-shifting transformer working area is then given by the dotted lines 144, 146.

A variation of ψ and δ results in a variation of the corresponding side of the working area. The thin straight lines 148, 150 inside the working area show this when ψ=−14° and δ=10° respectively. The operating point of the phase-shifting transformer 78 and the network 130 is given by the intersection of these straight lines 148, 150. Once the maxima of the phase-shift transformer 78 and the network 130 are established, the steady-state operating point is necessarily inside the working area and the nominal ratings of the phase-shifting transformer 102 can be calculated.

Referring to FIG. 17B, there is shown the working area of a power flow control apparatus according to the invention, resulting from the addition of a −0.05 p.u. capacitor 88 in parallel with the phase-shifting transformer 78. The power characteristic of this capacitor 88 is also presented. As shown by the arrows, the capacitor's value has been selected to exactly transit the power difference existing between the network limit and the current limit. In this condition, the action of the capacitor 88 is equivalent to removing the current limit of the phase-shifting transformer 78. The shaded zones 152, 154 are the increase of power flow control capabilities of the apparatus over those of its phase-shifting transformer 78 working alone.

Besides current limit elimination, the capacitor 88 increases the power flow control range. Used alone, the phase-shifting transformer 78 would need a tap changer set around −34° to force the same power flow than the apparatus set at −25°.

Depending on the point of operation of the apparatus, the power flow in the capacitor 88 and the phase-shifting transformer 78 can be in the same direction or of opposite direction. Same direction power flow is ideal since the two branches 76, 84 are working together. Slight opposite direction power flow can be still attractive if the capacitor 88 is carrying almost all the current line while the phase-shifting transformer 78 is slightly working against it. However, if the phase-shifting transformer 78 is working against the capacitor 88 up to the point where there is no net power flow, the apparatus is just dissipating losses without transit of power. Of course, no transfer of real power is something a phase-shifting transformer used alone can do best with minimal losses.

Referring to FIG. 17C, there is shown a graph based on the limits where the phase-shifting transformer 78 is dissipating the same losses, whether used alone or with the capacitor 88. These limits are used to define the shaded zones 156, 158 inside the apparatus working area where the apparatus will have less losses than the phase-shifting transformer 78 used alone. During normal operation, the capacitor 88 is in service only for all the points of operation located inside the shaded zones 156, 158. The heavy lines 160, 162 indicate the region where the phase-shifting transformer windings inside the apparatus will be subjected to their nominal current.

The closer the operating point is of the dotted line 164 where there is no power flow in the phase-shifting transformer 78, the smaller will be the losses since the capacitor 88 is then carrying most of the line current. Moreover, the more reactive power will be produced by the apparatus. It thus supports the voltages at its terminals 112, 114 as opposed to the phase-shifting transformer 78 used alone that consumes reactive power.

Outside the shaded zones 156, 158, it is more efficient to disconnect the capacitor 88 and use the phase-shifting transformer 78 alone. This transition from the apparatus to the phase-shifting transformer modes of operation can be done either when $\delta_{sr}$=0°, when no voltage is applied across the capacitor 88, or when the power flow is low. In either case, the switching can be done without any significant transient in the network 130.

For the example presented here, the rating of a capacitor design to work inside these shaded zones 156, 158 is calculated at ψ=−25° and δ=−20°.

It should be noted that power electronics can be added into the apparatus for transient purposes. Furthermore, depending on the AC network characteristics and the type of power flow control to achieve, an inductor may be used instead of the capacitor 88. Series impedances can be further added in series with the phase-shifting transformer 78. For instance, the reactive element 88 could be an inductor. Moreover, the reactive element 88 could be conveniently embodied by a variable capacitor or inductor whose variation is obtained either mechanically or electronically. The phase-shifting transformer 78 can be designed as a phase-shifting and voltage-regulating transformer whose construction is based on mechanical or electronic tap changers, all this to provide more flexibility and/or degrees of freedom to the invention and enlarge its field of applications.

Figure 11:
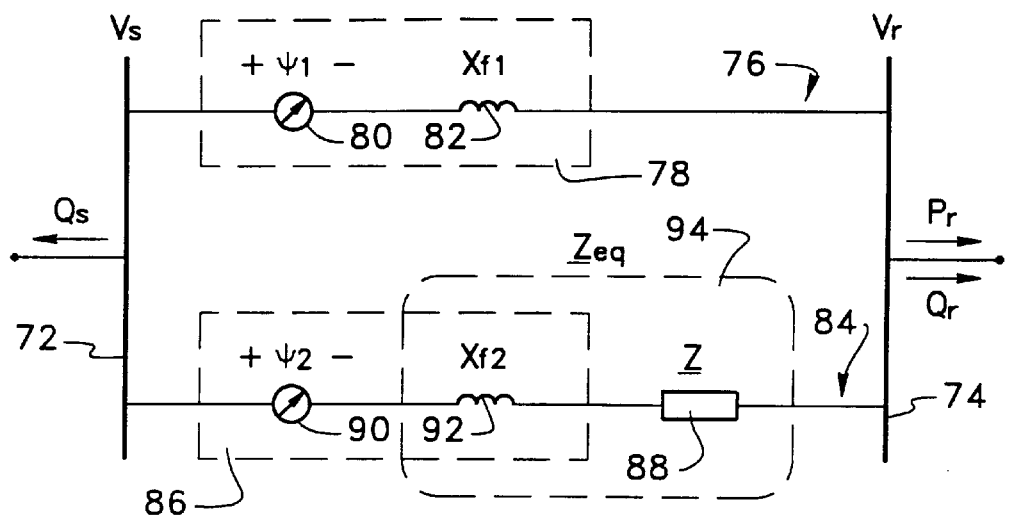
FIG. 11 shows a schematic diagram of an apparatus for power flow control according to the invention.

Referring now to FIG. 11, there is shown a schematic diagram of the interconnecting apparatus for power flow control between two synchronous polyphase AC network busses 72, 74 wherein:

a first branch 76 comprises a conventional phase-shifting transformer 78 depicted by an ideal phase-shifting element 80 producing a phase shift $\psi_1$ and a leakage reactance $X_f1$ also denoted by numeral 82; and a second branch 84, in parallel with the first branch 76, comprises a conventional phase-shifting transformer 86 in series with an impedance Z also denoted by numeral 88. The conventional phase-shifting transformer 86 is depicted by an ideal phase-shifting element 90 producing a phase shift $\psi_2$ in series with a leakage reactance $X_{f2}$ also denoted by numeral 92. This branch 84 will be hereinafter referred to as the high-impedance phase-sifting transformer branch or simply high-impedance phase-shifting transformer since, by design, Z>$X_f$. The equivalent impedance $Z_{eq}$ (also denoted as numeral 94) of this branch 84 is thus principally determined by Z. This impedance can be inductive or capacitive.

In order to fulfil the above-mentioned objectives according to the method hereinafter described, the high impedance phase-shifting transformer 84 must necessarily be installed in parallel with a conventional phase-shifting transformer 78 and it is this combination that forms the interconnecting apparatus herein described.

Figure 12A:
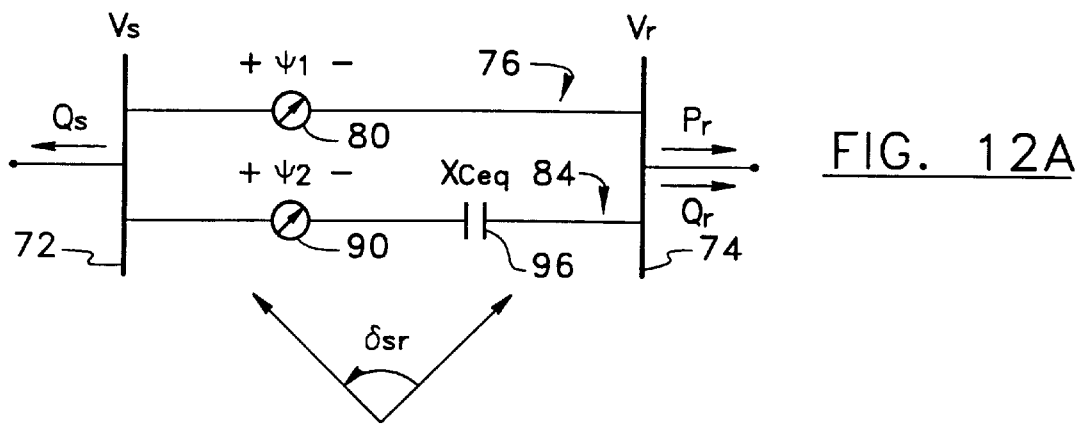
FIGS. 12A and 12B show respectively a schematic diagram of an apparatus for power flow control as shown in FIG. 11, wherein the series impedance is purely capacitive, and a graph of the corresponding idealized active and reactive power characteristics as a function of the phase angle at its terminals.

In order to facilitate the description of the operating principle of the apparatus, FIG. 12A shows a simplified diagram of the apparatus based on the following hypotheses:

the impedance Z is purely capacitive and has a much higher value than that of the leakage impedance $X_{f2}$ so that $Z_eq$ can be considered as a capacitive reactance $X_{Ceq}$, also denoted by numeral 96;

the leakage reactance $X_{f1}$ is much lower than the capacitive reactance $X_{Ceq}$ so that, from the point of view of the balance of active and reactive powers in both branches 76, 84 of the apparatus, the active power of the apparatus is controlled by the ideal phase-shifter 80 while the reactive powers on both sides of the apparatus are controlled by the ideal phase-shifter 90 and the reactance $X_{Ceq}$. It is thus possible to illustrate the operating principle of the system by setting $X_{f1}$=0;

the voltages on both sides of the apparatus are equal such that the reactive powers $Q_s$ and $Q_r$, defined as positive when outgoing from the apparatus, are equal.

These hypotheses are not required to ensure the good operation of the apparatus: they are only used to facilitate the description.

Figure 12B:
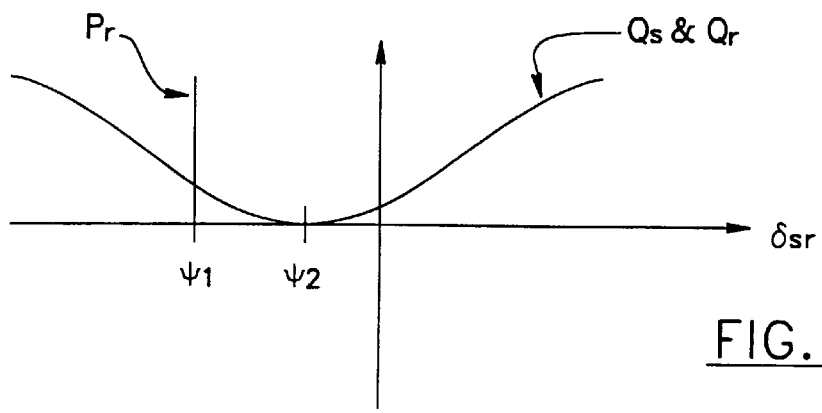

Referring to FIG. 12B, there is shown that the active power characteristic $P_r$ transmitted as a function of the phase-shift between the two network busses 72, 74 is a straight line having an infinite slope: a small variation of the phase angle $\delta_{sr}$ across the terminals of the apparatus produces an infinite variation of the power since the pure phase-shifter branch 76 has no impedance. The angular position of this characteristic is set by the pure phase-shifter 80; for a phase-shift $\psi_1$, the power characteristic crosses the abscissa at $\delta_{sr}=\psi_1$.

The reactive power characteristics $Q_s$ and $Q_r$ are determined by the capacitor's reactance $X_{Ceq}$; there is no reactive power absorbed by the pure phase-shifter 80. The angular position of these characteristics is set by the pure phase-shifter 90; for a phase-shift $\psi_2$, the characteristics touch the abscissa at $\delta_{sr}=\psi_2$.

Figure 13A:
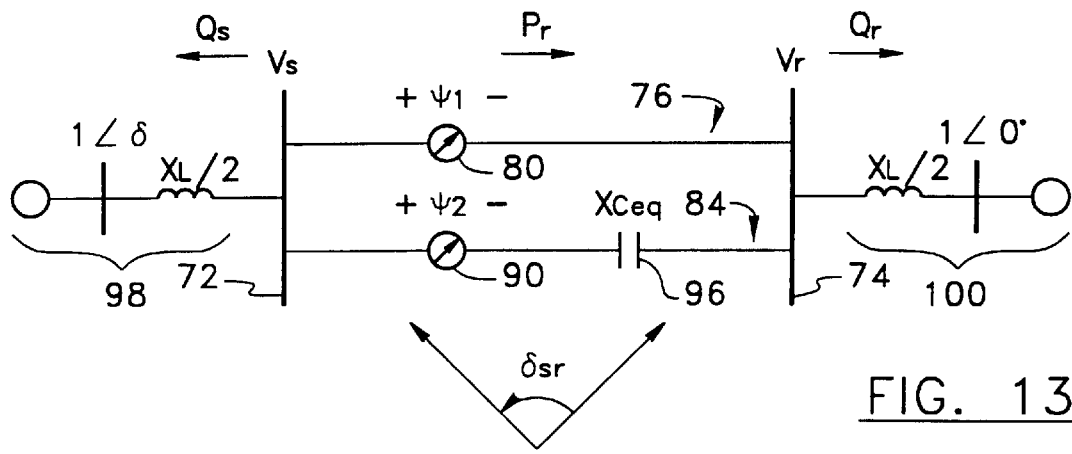
FIGS. 13A and 13B show respectively a schematic diagram of an idealized apparatus for power flow control as shown in FIG. 11, connected to two Thévenin equivalent circuits, and a graph of the corresponding idealized active and reactive power characteristics as a function of the phase angle at its terminals.

Referring to FIG. 13A, there is shown a schematic diagram of the apparatus connected to two Thévenin equivalent circuits 98, 100. The above-mentioned hypotheses are also used here. The diagram models the operation of the system in network applications where it is connected in series with a transmission line or where it is used as an interconnecting circuit between two busses of the same network or between two busses of synchronous networks.

Figure 13B:
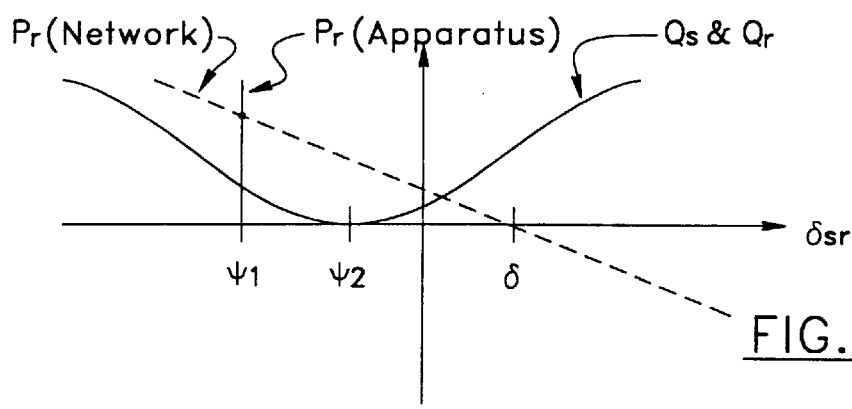

Referring to FIG. 13B, the active and reactive power characteristics of the apparatus are superimposed on the same set of axes. The dotted straight line represents the active power characteristic $P_r$ of the network. The slope of this characteristic $P_r$ is determined by the sum of the external impedances $X_L/2$ (shown in FIG. 13A) while the angular position of this dotted straight line is determined by the phase-shift between the Thévenin sources 98, 100 (shown in FIG. 13A); the line crosses the abscissa at $\delta_{sr}=\delta$.

The operating point of the apparatus-network combination is given by the intersection of the active power characteristics $P_r$ located at $\delta_s r=\psi_1$. The reactive power generated by the system is directly given by the reactive power characteristic $Q_s$ and $Q_r$ at $\delta_s r=\psi_1$.

It is thus possible to adjust independently the transfer of active power by means of $\psi_1$ and the quantity of reactive power generated on both sides of the system by means of $\psi_2$.

The adjustment of the phase-shifts $\psi_1$ and $\psi_2$ is carried out by means of tap changers as in a conventional phase-shifting transformer. Thyristor-based phase-shifting transformers can also be used.

Although not illustrated, the impedance of the high-impedance phase-shifting transformer 84 can be provided with means for varying its value or even changing its nature (inductive or capacitive) in order to enhance, if need be, the operating flexibility of the apparatus. A phase-shifting and voltage-regulating transformer can also be used to extend the possibilities of the apparatus. Moreover, power electronic can be used to further enhance the performance for both impedance and phase-shifting transformer variations.

In the case where $X_{f1}$ is not negligible:

the power characteristic $P_r$ is not a straight line of infinite slope anymore, but a sinusoid segment around 0°;

the phase-shift $\psi_1$ is chosen to be lower than $\psi_2$, as shown in FIG. 13B, so that the transfer of active power in the high-impedance phase-shifter branch 84 is in the same direction as the transfer across the conventional phase-shifter branch 76 to relieve the latter. Furthermore, the reactive power balance of the apparatus must take into account the reactive power absorbed by the conventional phase-shifting transformer branch 76;

for a given phase angle $\delta_{sr}$, the reactive power generated by the apparatus is lower than the reactive power generated by the ideal apparatus shown in FIGS. 12A and 13A;

for a certain range of $\psi_2$ around $\delta_s r$, it is possible to absorb a certain quantity of reactive power on both sides of the apparatus.

The present system shares some similarities with the following systems without however being implemented in the same way.

Two conventional phase-shifting transformers can be connected in parallel to obtain transfer levels not accessible with a single phase-shifting transformer.

The design of the present apparatus is distinct from the aforesaid type of installation because there is, in series with one of the two phase-shifting transformers, a high impedance with respect to their leakage impedances.

Moreover, since the leakage impedances of the conventional phase-shifting transformers are low, it is essential that they be identical and always adjusted at the same tap position to avoid current flows from a phase-shifting transformer to the other. The parallelling of two conventional phase-shifting transformers does not provide two degrees of freedom to control independently the active power and the reactive powers in comparison with the present apparatus.

In order to obtain the desired power flow, it can be required to install a conventional phase-shifting transformer in series with a series compensation system to compensate a transmission line (electrically shortening the line) and force a phase angle at its terminals that is different from the phase angle that would normally be present.

The design of the present apparatus differs from this type of installation since a second phase-shifting transformer 80 is connected in parallel with the phase-shifting transformer 90 equipped with a series impedance 88.

It is worth noting that the phase-shifting transformer and the conventional series compensation constitute a system that does not provide two degrees of freedom as is the case for the present apparatus.

The topology of the present apparatus is similar to the topology of a constant-current transformer (as described in the previous section) that uses a conventional transformer instead of a phase-shifting transformer.

The design of the present apparatus differs from an interphase power controller for the same reasons as those mentioned for the apparatus and method for enhancing the capacity of a transformer station in the case of the constant-current transformer.

The present apparatus is typically intended for network applications where independent control of the active and reactive powers is desired. It effectively allows to adjust the transfer of active power by means of the conventional phase-shifting transformer branch 76 while providing voltage support by means of the high-impedance phase-shifting transformer branch 84 when the latter has a capacitive nature.

The parallel installation of the two systems' branches 76, 84 is particularly useful in comparison with the installation of a conventional phase-shifting transformer and a shunt capacitor bank. In the present apparatus, the capacitor 88 carries a current having a component which contributes to the transfer of active power allowing to relieve the conventional phase-shifting transformer 78 and to reduce therefore its dimensioning. Furthermore, by using a large number of tap positions on the high-impedance phase-shifting transformer 86, a relatively precise adjustment of the generated or absorbed reactive power can be obtained.

Therefore, the present apparatus provides the possibility of adjusting the active power at an advantageous cost while contributing to the support of the network voltages.

Although the present invention has been explained hereinafter by way of preferred implementations thereof, it should be pointed out that any modifications to these preferred implementations are not deemed to change or alter the nature and scope of the present invention.

We claim:

1. A transformer apparatus for a polyphase AC network, comprising:
   at least one conventional transformer branch or several transformer branches in parallel, each including opposite ends for connection with the AC network;
   a transformer having a small leakage impedance so that current in the conventional transformer branches produces at the ends thereof a small phase angle $\delta_{sr}$ slightly varying depending on a load level of the AC network;
   a constant current transformer branch connected in parallel with the conventional transformer branches, the constant current transformer branch including a phase-shifting transformer to produce at ends thereof a phase angle $\psi$ substantially greater in absolute value than the small phase angle $\delta_{sr}$; and
   reactive elements in series with the phase-shifting transformer, for increasing an impedance of the constant current transformer branch,
   wherein the reactive elements are capable of sustaining at ends thereof a phase angle equal to $\delta_{sr}-\psi$.

2. A transformer apparatus according to claim 1, wherein the reactive elements include inductors chosen so that their short-circuit current has a same order of magnitude as a load current in the constant current transformer branch.

3. A transformer apparatus according to claim 1, wherein the reactive elements include capacitors chosen so that their short-circuit current has the same or greater order of magnitude than a load current in the constant current transformer branch.

4. A transformer apparatus according to claim 1, wherein the reactive elements have values chosen so that the constant current transformer branch absorbs or generates a predetermined amount of reactive power.

5. A transformer apparatus according to claim 1, wherein the constant current transformer branch further includes compensation impedances in parallel with the phase-shifting transformer.

6. A transformer apparatus according to claim 5, wherein the compensation impedances and the reactive elements have conjugated values.

7. A transformer apparatus according to claim 1, wherein the phase-shifting transformer comprises a series transformer having primary windings in series with the reactive elements and secondary windings connected to additional windings in the constant current transformer branch used to derive excitation signals that are injected in the primary windings via the secondary windings to obtain the phase angle $\psi$.

8. A transformer apparatus according to claim 7, wherein the primary windings have first and second opposite portions, and the reactive elements comprise inductors and capacitors respectively connected to the first and second portions of the primary windings.

9. A transformer apparatus according to claim 8, wherein the constant current transformer branch further includes compensation impedances comprising capacitors and inductors respectively connected in parallel with the first and second portions of the primary windings.

10. A transformer apparatus according to claim 1, wherein each of the conventional transformer branches and the constant current transformer branch includes a step down transformer.

11. A transformer apparatus according to claim 10, wherein the phase-shifting transformer and the step down transformer of the constant current transformer branch are combined together.

12. A method of enhancing a capacity of transformer equipment for a polyphase AC network, the transformer equipment including at least one conventional transformer branches in parallel, each including opposite ends for connection with the AC network, and a transformer having a small leakage impedance so that current in the conventional transformer branches produces at the ends thereof a small phase angle $\delta_{sr}$ slightly varying depending on a load level of the AC network, the method comprising the step of:
   adding a constant current transformer branch in parallel with the conventional transformer branches, the constant current transformer branch including a phase-shifting transformer to produce at ends thereof a phase angle $\psi$ substantially greater in absolute value than the phase angle $\delta_{sr}$, and reactive elements in series with the phase-shifting transformer, for increasing an impedance of the constant current transformer branch, the reactive elements being capable to sustain at ends thereof a phase angle equal to $\delta_{sr}-\psi$.

13. A method according to claim 12, wherein the reactive elements include inductors, the method comprising the additional step of choosing the inductors so that their short-circuit current has a same order of magnitude as a load current in the constant current transformer branch.

14. A method according to claim 12, wherein the reactive elements include capacitors, the method comprising the additional step of choosing the capacitors so that their short-circuit current has the same or greater order of magnitude than a load current in the constant current transformer branch.

15. A method according to claim 12, wherein the method comprises the additional step of choosing values of the reactive elements so that the constant current transformer branch absorbs or generates a predetermined amount of reactive power.

16. A method according to claim 12, wherein the method comprises the additional step of adding compensation impedances in parallel with the phase-shifting transformer of the constant current transformer branch.

17. A method according to claim 12, wherein each of the conventional transformer branches and the constant current transformer branch include a step down transformer.

18. An interconnecting apparatus for power flow control between two synchronous polyphase AC network busses, comprising:

a first branch having opposite ends for connection respectively with the two AC network busses, the first branch including an adjustable phase-shifting transformer to produce at ends thereof an adjustable phase angle $\psi_1$; and a second branch in parallel with the first branch, including reactive elements to transfer conjointly with the first branch, active power between the two AC network busses depending on the phase angle $\psi_1$.

19. An interconnecting apparatus according to claim 18, wherein the second branch further includes in series with the reactive elements, a second adjustable phase-shifting transformer to produce at ends thereof an adjustable phase angle $\psi_2$ the reactive elements having a substantially higher impedance than leakage impedances of the first and second phase-shifting transformers.

20. An interconnecting apparatus according to claim 18, wherein the reactive elements include at least one of capacitors and inductors.

21. An interconnecting apparatus according to claim 19, wherein the reactive elements include at least one of capacitors and inductors.

22. A method of power flow control between two synchronous polyphase AC network busses, comprising the steps of:

connecting between the two AC network busses, a first branch including an adjustable phase-shifting transformer to produce at ends of the first branch an adjustable phase angle $\psi_1$;

connecting a second branch in parallel with the first branch, the second branch including reactive elements for absorbing or generating reactive power; and adjusting the phase angle $\psi_1$ for controlling a quantity of active power transferred between the two AC network busses.

23. A method according to claim 22, wherein the method comprises the additional steps of:

connecting in series with the reaction elements a second adjustable phase-shifting transformer to produce at ends thereof an adjustable phase angle $\psi_2$, the reactive elements having a substantially higher impedance than leakage impedances of the first and second phase-shifting transformers;

adjusting the phase angle $\psi_1$ for at least controlling a quantity of active power transferred between the two synchronous AC network busses; and adjusting the phase angle $\psi_2$ for at least controlling a quantity of reactive power generated or reactive elements.

\* \* \* \* \*